(12) United States Patent
Cheng et al.

(10) Patent No.: US 7,822,445 B2
(45) Date of Patent: Oct. 26, 2010

(54) HAND HELD APPARATUS AND FLIP DEVICE THEREOF

(75) Inventors: Yung-Fa Cheng, Taipei Shien (TW); Hsin-Hung Chen, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1002 days.

(21) Appl. No.: 11/604,757

(22) Filed: Nov. 28, 2006

(65) Prior Publication Data

US 2008/0014999 A1   Jan. 17, 2008

(30) Foreign Application Priority Data

Jul. 11, 2006   (TW) .............. 95212183 U

(51) Int. Cl.
*H04M 1/00* (2006.01)
(52) U.S. Cl. .............. 455/575.3; 455/575.1; 455/90.3; 379/433.13; 348/14.02
(58) Field of Classification Search ............. 455/575.1, 455/575.3, 90.3, 550.1; 379/433.13
See application file for complete search history.

(56) References Cited

U.S. PATENT DOCUMENTS

| | | | | |
|---|---|---|---|---|
| 6,459,887 B2 * | 10/2002 | Okuda | ........................ | 455/90.1 |
| 6,470,175 B1 * | 10/2002 | Park et al. | .................. | 455/90.1 |
| 6,628,974 B1 * | 9/2003 | Lim | ........................ | 455/575.3 |
| 7,133,691 B2 * | 11/2006 | Kang | ........................ | 455/556.1 |
| 7,146,200 B2 * | 12/2006 | Park et al. | .................. | 455/575.3 |
| 7,245,948 B2 * | 7/2007 | Jung et al. | ................ | 455/575.1 |
| 7,346,377 B2 * | 3/2008 | Sakai et al. | ............... | 455/575.3 |
| 7,392,072 B2 * | 6/2008 | Im | ........................ | 455/575.3 |
| 7,447,309 B2 * | 11/2008 | Zhitao et al. | ........... | 379/433.13 |
| 7,672,697 B2 * | 3/2010 | Kim | ........................ | 455/575.3 |
| 2004/0203522 A1 * | 10/2004 | Lim | ........................ | 455/90.3 |

* cited by examiner

*Primary Examiner*—Sharad Rampuria
(74) *Attorney, Agent, or Firm*—Rabin & Berdo, PC

(57) ABSTRACT

A hand held apparatus includes a base, a foldable cover, a positioning seat, an elastic surface and a cam. The positioning seat is mounted on the base. The elastic surface is mounted on the base. The cam is mounted on the foldable cover and touches the elastic surface. The cam further has a positioning pin at one end thereof, and the positioning pin is pivotally coupled to the positioning seat, such that the foldable cover has the ability to be elastically rotated relative to the base.

14 Claims, 3 Drawing Sheets

HAND HELD APPARATUS AND FLIP DEVICE THEREOF

RELATED APPLICATIONS

The present application is based on, and claims priority from, Taiwan Application Serial Number 95212183, filed Jul. 11, 2006, the disclosure of which is hereby incorporated by reference herein in its entirety.

BACKGROUND

1. Field of Invention

The present invention relates to a mobile phone. More particularly, the present invention relates to a clam type mobile phone.

2. Description of Related Art

Mobile phones are portable, wireless telephone devices installed on conveyances or carried by a user. Clam type mobile phones are increasingly popular today. A conventional clam type mobile phone has a foldable cover to prevent the keypad from being touched by users. Furthermore, the foldable cover also protects the keypad and the screen from damage.

Generally, a clam type mobile phone has an elastic hinge mounted in the hinge seat thereof to enable the clam type mobile phone to be flipped open and closed. Accordingly, the hinge seat should be large enough to contain the elastic hinge. However, such a large hinge seat increases the size and the weight of the clam type mobile phone.

Moreover, because the elastic hinge is very expensive, the manufacturing cost of the clam type mobile phones is high as well. Considering modern users prefer light, small and cheap commercial mobile phones, the above mentioned problems seriously damage the market competitiveness of clam type mobile phones.

For the forgoing reasons, there is a need to develop a clam type mobile phone to reduce the space occupied by the hinge seat, to have a cheaper price and to provide flipping open and close functions for manufacturers, sales and consumers.

SUMMARY

According to one embodiment of the present invention, a hand held apparatus includes a base, a foldable cover, a positioning seat, an elastic surface and a cam. The positioning seat is mounted on the base. The elastic surface is mounted on the base. The cam is mounted on the foldable cover and touches the elastic surface. The cam further has a positioning pin at one end thereof, and the positioning pin is pivotally coupled to the positioning seat, such that the foldable cover has the ability to be elastically rotated relative to the base.

According to another embodiment of the present invention, a flip device for pivoting a foldable cover and a base includes a positioning seat, an elastic surface and a cam. The positioning seat is mounted on the base. The elastic surface is mounted on the base. The cam is mounted on the foldable cover and touches the elastic surface. The cam further has a positioning pin at one end thereof, and the positioning pin is pivotally coupled to the positioning seat, such that the foldable cover has the ability to be elastically rotated relative to the base.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
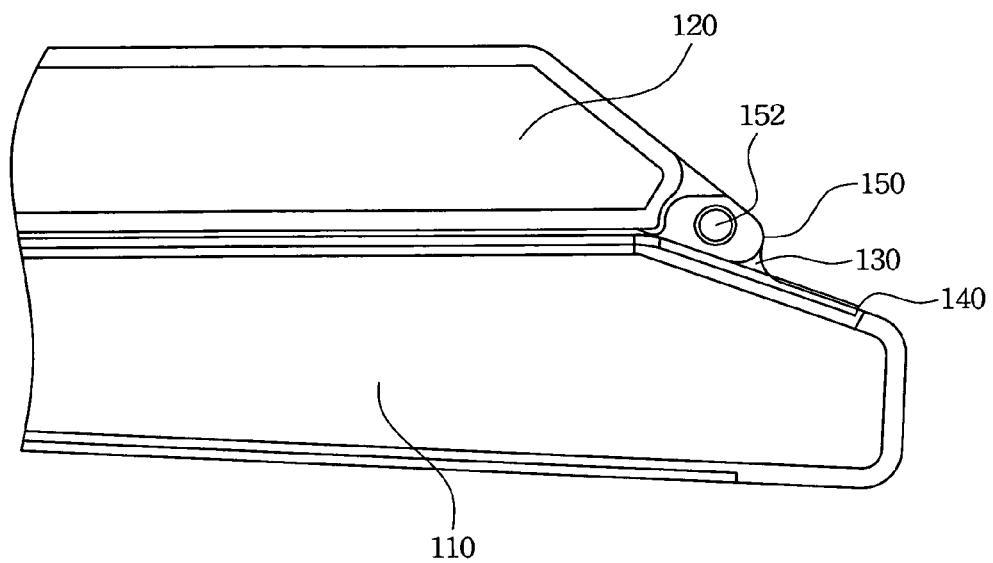
FIG. 1 is a perspective side view of a clam type mobile phone according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

The term "hand held apparatus" mentioned in the present application may be a personal digital assistant (PDA), an electronic dictionary, a digital camera, a mobile phone or other device with a foldable cover. The following illustration will take a clam type mobile phone for example to specify the embodiments of the invention.

Refer to FIG. 1. FIG. 1 is a perspective side view of a clam type mobile phone according to one embodiment of this invention. As shown in FIG. 1, a clam type mobile phone includes a base 110, a foldable cover 120, a pair of positioning seats 130, an elastic surface 140 and a cam 150. The positioning seat 130 is mounted on the base 110. The elastic surface 140 is mounted on the base 110 as well. The cam 150 is mounted on the foldable cover 120 and touches the elastic surface 140. The cam 150 further has a pair of positioning pins 152 at two ends thereof respectively, and the positioning pins 152 are pivotally coupled to the positioning seats 130, such that the foldable cover 120 has the ability to be elastically rotated relative to the base 110 when being opened or closed. More specifically, when a user starts rotating the foldable cover 120, the cam 150 pushes the elastic surface 140 such that the elastic surface 140 is deformed to save elastic potential energy. After the contact surface of the cam 150 and the elastic surface 140 moves over the vertical projection of the positioning pins 152 on the elastic surface 140, the elastic surface releases the elastic potential energy to rotate the cam 150 continuously. Accordingly, the foldable cover 120 can be rotated relative to the base 110 automatically at this time.

On the other hand, the embodiment also discloses a flip device for pivoting a foldable cover 120 and a base 110. The flip device includes a pair of positioning seats 130, an elastic surface 140 and a cam 150. The positioning seats 130 are mounted on the base 110. The elastic surface 140 is mounted on the base 110 as well. The cam 150 is mounted on the foldable cover 120 and touches the elastic surface 140. The cam 150 further has a pair of positioning pins 152 at two ends thereof respectively, and the positioning pins 152 are pivotally coupled to the positioning seats 150, such that the foldable cover 120 has the ability to be elastically rotated relative to the base 110 when being opened or closed.

Figure 2:
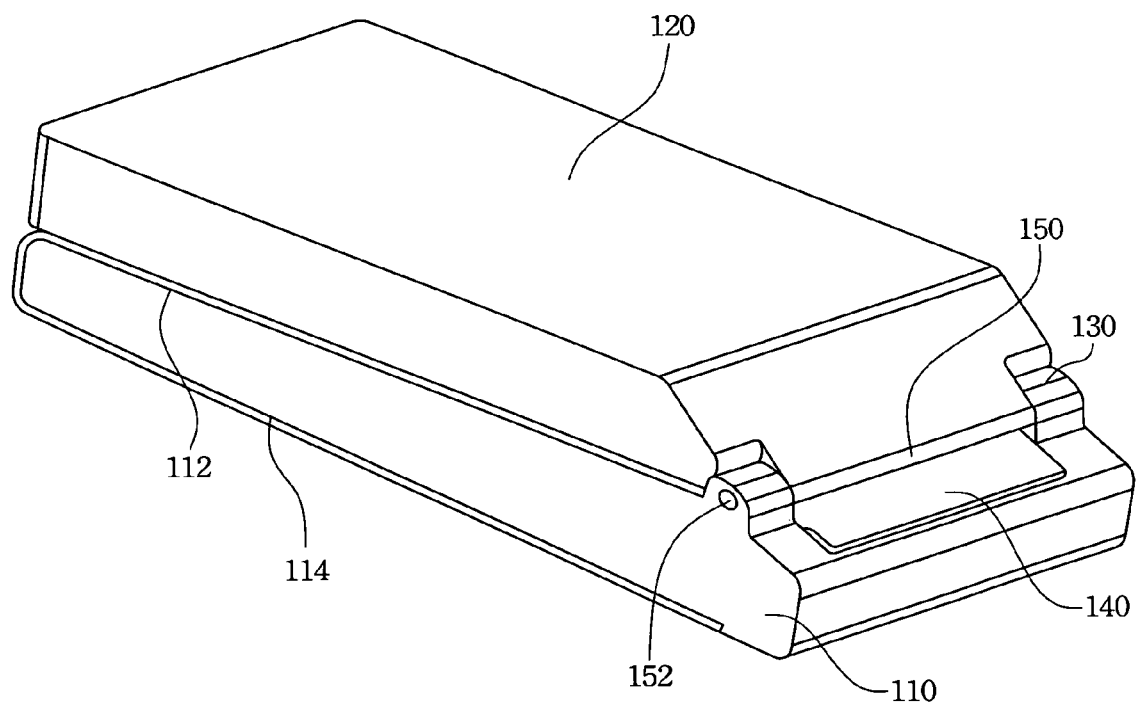
FIG. 2 is a three dimensional view of the clam type mobile phone shown in FIG. 1.

Refer to FIG. 2. FIG. 2 is a three dimensional view of the clam type mobile phone shown in FIG. 1. In this embodiment, the elastic surface may be a plate spring. At least a part of the plate spring is positioned on the outside of a top shell 112 of the base 110, facing the foldable cover 120. The plate spring may be extended to and fixed on the outside of a bottom shell 114 of the base 110, away from the foldable cover 120, to fasten the plate spring to the base 110 firmly. Moreover, because the plate spring is extended to the outside of the bottom shell 114, the moment arm of the plate spring is lengthened, and the force that the elastic surface 140 pushes to the cam 150 can be smoother. In addition, the plate spring according to the present embodiment may be integrated with keys, which may be positioned on the base 110, and thus the clam type mobile phone would have an unusual appearance.

Figure 3:
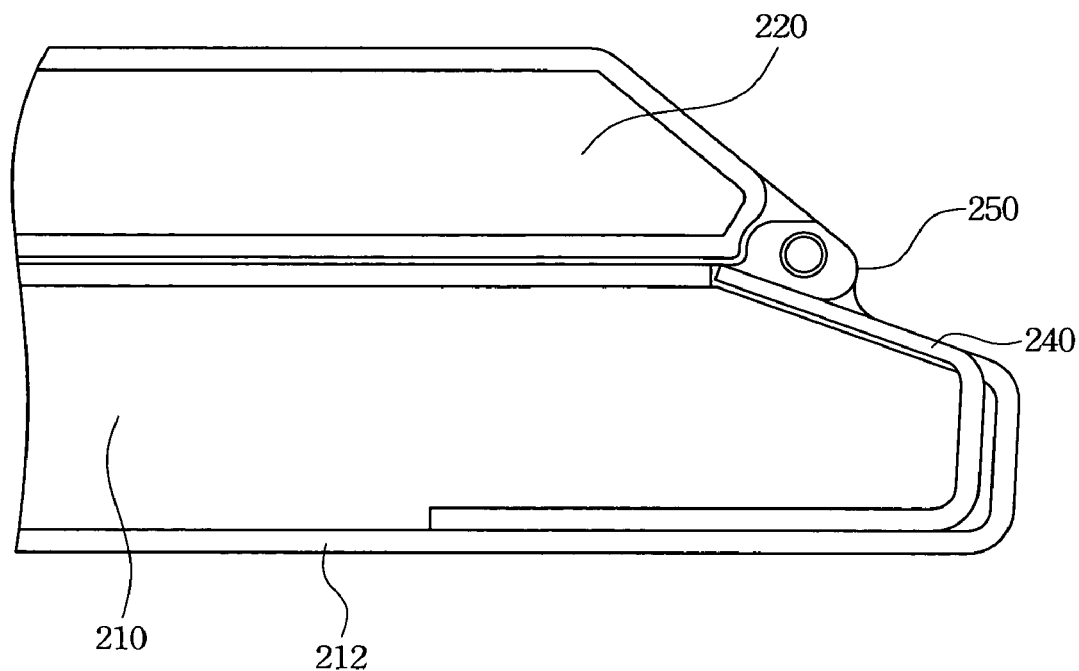
FIG. 3 is a perspective side view of a clam type mobile phone according to another embodiment of this invention.

Refer to FIG. 3. FIG. 3 is a perspective side view of a clam type mobile phone according to another embodiment of this invention. In this embodiment, the elastic surface may be a C-shaped spring 240, and at least a part of the C-shaped spring 240 is positioned in the base 210. The C-shaped spring 240 may be extended and fixed on the inside of the bottom shell 212 of the base 210, away from the foldable cover 220, to fasten the C-shaped spring 240 to the base 210 firmly. Moreover, because the C-shaped spring 240 is extended to the inside of the bottom shell 212, the moment arm of the C-shaped spring 240 is lengthened, and hence the force that the C-shaped spring 240 pushes to the cam 250 can be smoother.

Figure 4:
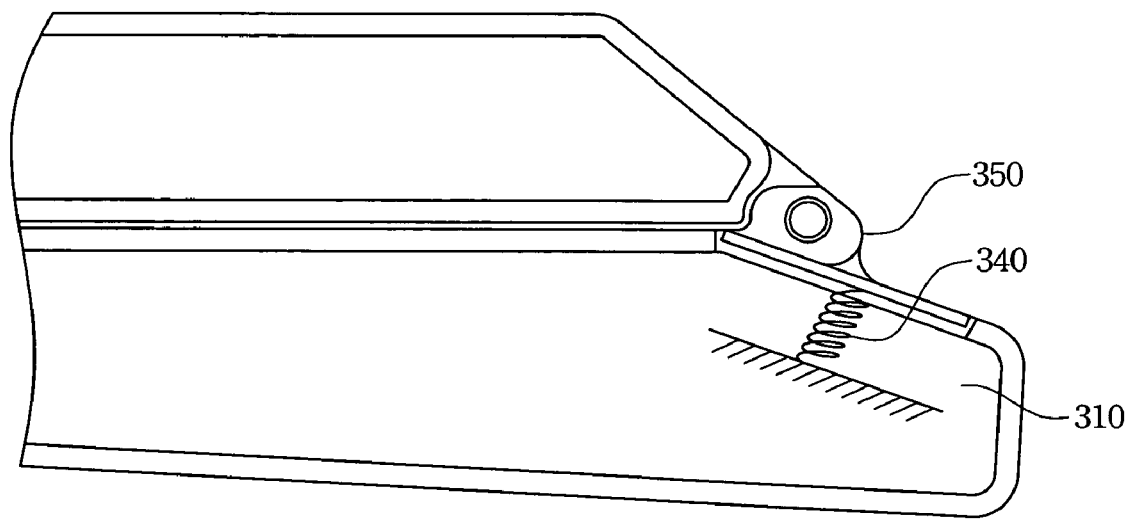
FIG. 4 is a perspective side view of a clam type mobile phone according to yet another embodiment of this invention.

Refer to FIG. 4. FIG. 4 is a perspective side view of a clam type mobile phone according to yet another embodiment of this invention. In this embodiment, the elastic surface may be a compressive spring 340 mounted in the base 310 and touching the cam 350. Because the compressive spring is cheap and reliable, manufacturers may select the compressive spring as the elastic surface to reduce the manufacturing cost of the clam type mobile phone, and furthermore the reliability of the clam type mobile phone is improved as well.

Figure 5:
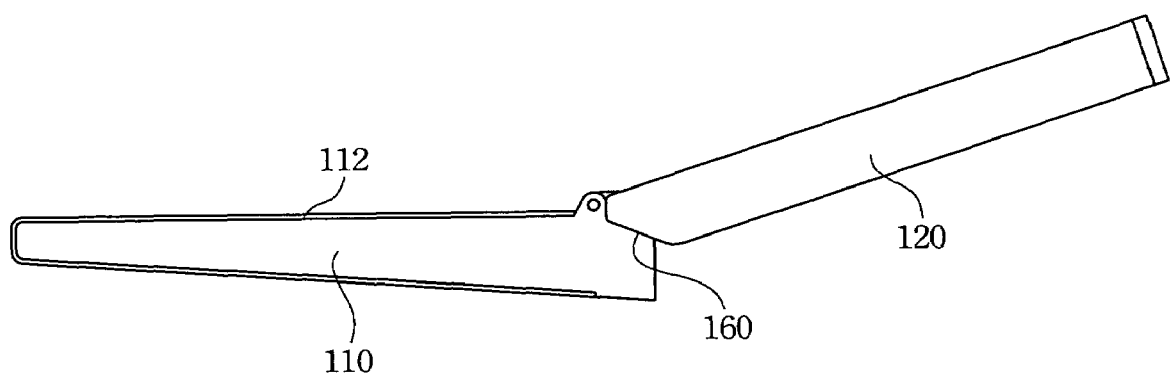
FIG. 5 is a side view of the clam type mobile phone shown in FIG. 1 when the clam type mobile phone is flipping opened.

Refer to FIG. 5. FIG. 5 is a side view of the clam type mobile phone shown in FIG. 1 when the clam type mobile phone is flipped open. As shown in FIG. 5, the base 110 may further have a stopping surface 160 adjacent to the top shell 112. The stopping surface 160 is used to stop the foldable cover 120 from being rotated when an angle between the foldable cover 120 and the base 110 reaches a predetermined angular magnitude (for example 160 degrees). Accordingly, manufacturers may design this angle in accordance with ergonomics, and thus the competitiveness of the clam type mobile phone can be raised.

As embodied and broadly described herein, the hand held apparatus and the flip device according to the embodiments of the invention has the following advantages:

(1) the embodiments of the invention replace the expensive elastic hinge with the cam and the elastic surface, and hence the manufacture cost of the hand held apparatus is reduced; and (2) because the hand held apparatus does not need the elastic hinge, the large hinge seat can be replaced by the positioning seat and the positioning pin with smaller size, and hence the hand held apparatus has more space to be utilized than the prior art.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hand held apparatus comprising:
    a base;
    a foldable cover;
    at least one positioning seat mounted on the base;
    an elastic surface mounted on the base; and
    a cam mounted on and rotated with the foldable cover, and the cam directly touching the elastic surface, wherein the cam has at least one positioning pin at one end thereof, and the positioning pin is pivotally coupled to the positioning seat, such that the foldable cover has the ability to be elastically rotated relative to the base, wherein the elastic surface and the cam are both exposed to the outside of the hand held apparatus.

2. The hand held apparatus of claim 1, wherein the base has a top shell facing the foldable cover, the elastic surface is a plate spring, and at least a part of the plate spring is positioned on the outside of the top shell.

3. The hand held apparatus of claim 2, wherein the base further has a bottom shell away from the foldable cover, and the plate spring is extended to and fixed on the outside of the bottom shell.

4. The hand held apparatus of claim 1, wherein the elastic surface is a C-shaped spring, and at least a part of the C-shaped spring is positioned in the base.

5. The hand held apparatus of claim 4, wherein the base has a bottom shell away from the foldable cover, and the C-shaped spring is extended to and fixed on the inside of the bottom shell.

6. The hand held apparatus of claim 1, wherein the elastic surface is a compressive spring mounted in the base and touching the cam.

7. The hand held apparatus of claim 1, wherein the base further has a top shell facing the foldable cover and a stopping surface adjacent to the top shell for stopping the foldable cover from being rotated when an angle between the foldable cover and the base reaches a predetermined angular magnitude.

8. A flip device for pivoting a foldable cover and a base comprising:
    at least one positioning seat mounted on the base;
    an elastic surface mounted on the base; and
    a cam mounted on and rotated with the foldable cover, and the cam directly touching the elastic surface, wherein the cam has at least one positioning pin at one end thereof, and the positioning pin is pivotally coupled to the positioning seat, such that the foldable cover has the ability to be elastically rotated relative to the base, wherein the elastic surface and the cam are both exposed to the outside of the flip device.

9. The flip device of claim 8, wherein the elastic surface is a plate spring, and at least a part of the plate spring is positioned on the outside of a top shell of the base, facing the foldable cover.

10. The flip device of claim 9, wherein the plate spring is extended to and fixed on the outside of a bottom shell of the base, away from the foldable cover.

11. The flip device of claim 8, wherein the elastic surface is a C-shaped spring, and at least a part of the C-shaped spring is positioned in the base.

12. The flip device of claim 11, wherein the C-shaped spring is extended to and fixed on the inside of a bottom shell of the base, away from the foldable cover.

13. The flip device of claim 8, wherein the elastic surface is a compressive spring mounted in the base and touching the cam.

14. The flip device of claim 8, further comprising a stopping surface adjacent to a top shell of the base, facing the foldable cover, for stopping the foldable cover from being rotated when an angle between the foldable cover and the base reaches a predetermined angular magnitude.

* * * * *